United States Patent
Canella et al.

(10) Patent No.: US 7,496,150 B2
(45) Date of Patent: Feb. 24, 2009

(54) TRANSMISSION APPARATUS WITH VARIABLE IMPEDANCE MATCHING

(75) Inventors: Alberto Canella, Villach (AT); Christian Jenkner, Velden (AT); David Schwingshackl, Villach (AT)

(73) Assignee: Infineon Technologies AG, Munich (DE)

( * ) Notice: Subject to any disclaimer, the term of this patent is extended or adjusted under 35 U.S.C. 154(b) by 567 days.

(21) Appl. No.: 10/977,711

(22) Filed: Oct. 29, 2004

(65) Prior Publication Data

US 2005/0114427 A1 May 26, 2005

(30) Foreign Application Priority Data

Nov. 19, 2003 (DE) ................. 103 54 113

(51) Int. Cl.
*H04M 7/04* (2006.01)

(52) U.S. Cl. .................... 375/295; 379/394; 379/398

(58) Field of Classification Search ............ 375/295; 379/394, 398
See application file for complete search history.

(56) References Cited

U.S. PATENT DOCUMENTS

| | | | | |
|---|---|---|---|---|
| 4,893,316 A | * | 1/1990 | Janc et al. ........... | 708/300 |
| 6,870,893 B2 | * | 3/2005 | Tore ................... | 375/350 |
| 7,254,281 B2 | * | 8/2007 | Slavin ................. | 382/298 |
| 2002/0114444 A1 | | 8/2002 | Anderson et al. | |
| 2002/0191638 A1 | | 12/2002 | Wang et al. | |
| 2004/0218702 A1 | * | 11/2004 | Denk .................. | 375/350 |

OTHER PUBLICATIONS

"Recursive and non-recursive filters," Dec. 10, 2000, http://www.dsptutor.freeuk.com/dfilt8.htm (accessed on Sep. 25, 2007).*

* cited by examiner

*Primary Examiner*—Shuwang Liu
*Assistant Examiner*—David Huang
(74) *Attorney, Agent, or Firm*—Jenkins, Wilson, Taylor & Hunt, P.A.

(57) ABSTRACT

The invention provides a transmission apparatus (100) for transmission of electrical signals between a line driver (205), which is connected to a transmission line (201), and a switching center (301), having an analog feedback device (101) for coarse setting of a line voltage level (210) on the transmission line (201), and a digital feedback device (102), which is coupled to the analog feedback device (101) and has a feedback filter device (118), designed such that a filter input signal (404) can be converted to a filter output signal (405) at a rate which is lower than the sampling rate ($f_a$) of an analog/digital converter (104).

9 Claims, 3 Drawing Sheets

TRANSMISSION APPARATUS WITH VARIABLE IMPEDANCE MATCHING

TECHNICAL FIELD

The present invention relates in general to transmission apparatuses with a variable input/output impedance, and relates in particular to a transmission apparatus which provides impedance matching for speech coding/decoding units.

BACKGROUND ART

The invention relates specifically to a transmission apparatus for transmission of electrical signals between a line driver, which is connected to a transmission line, and a switching center, having:

a) an analog feedback device for coarse setting of a line voltage level on the transmission line as a function of a line current which is detected in the line driver; and b) a digital feedback device, which has a feedback filter device for fine setting of an amplitude and phase relationship between the line voltage level and the line current.

FIG. 3 shows a coding/decoding unit (Codec) based on the prior art. The coding/decoding unit is connected via a filter F2 to a line driver (SLIC=Subscriber Line Interface Circuit). The line driver is connected via a further filter F1 to a transmission line L, which is represented in FIG. 3 by a (generally complex) resistor. The line driver contains a power amplifier and a current sensor device for detection of the current which is flowing in the line. The coding/decoding unit Codec is required, inter alia, in order to set a country-specific input impedance.

Normally, this is done by means of programmable analog and digital feedback loops AS, DS1 and DS2. The coding/decoding unit (CODEC) illustrated in FIG. 3 comprises an analog circuit part and a digital circuit part, which are isolated from one another by an analog/digital converter ADC and/or a digital/analog converter DAC. As illustrated, the analog part contains an analog feedback loop AS, while the digital part contains two digital feedback loops DS1 and DS2.

The signal which is emitted from the current sensor is supplied via the filter F2 to a pre-filter PREFI for the coding/decoding unit. The signal which is emitted from the pre-filter PREFI is supplied on the one hand to the analog/digital converter ADC and on the other hand is fed back in an analog feedback loop AS, and is supplied to a summation device "+". The analog feedback loop AS makes it possible to set a line voltage level on the transmission line as a function of a line current which is detected in the line driver.

The digital feedback loops DS1 and DS2 which are provided in the digital part of the coding/decoding unit are used for fine setting of an exact amplitude and phase relationship between the line voltage level and the line current. The feedback loop DS1 feeds a signal, which is output between two decimation units D1 and D2, back to a summation unit which is arranged between two interpolation units I1 and I2.

The feedback loop DS2 feeds the output signal from the decimation unit D2 back to the input of the interpolation unit I1 by superimposing the signal to be transmitted on the feedback signal in a summation unit "+". The signal which is emitted from the second interpolation unit I2 is converted in the digital/analog converter DAC to an analog signal and is supplied to a post-filter unit POFI. The signal which is emitted from the post-filter unit POFI has the analog feedback signal that is produced by the analog feedback loop superimposed on it. This means that the conventional circuit arrangement illustrated in FIG. 3 can be used to provide both a line voltage level and a phase relationship between the voltage and the current, that is to say complex line impedance matching.

The conventional circuit arrangement illustrated in FIG. 3 for setting a complex line impedance has significant disadvantages, however. The first feedback loop DS1 contained in the digital part has to operate at a high sampling rate, since the feedback signal is in fact extracted after the decimation by the first decimation device D1. This means that this digital feedback loop has to be designed for a high signal and sampling rate. A further disadvantage is that the digital feedback loop DS1 comprises a recursive filter unit, which is less flexible than a non-recursive filter unit.

A further disadvantage is that it is difficult to reduce the number of coefficients in a recursive filter unit which is arranged as shown in FIG. 3. A recursive filter unit is disadvantageously less flexible than a non-recursive filter unit.

One major disadvantage of the conventional circuit arrangement illustrated in FIG. 3 is that two digital feedback loops must be provided in the digital circuit part, in addition to the analog feedback loop in the analog circuit part. This considerably increases the circuit complexity, and disadvantageously leads to an increase in cost.

SUMMARY OF THE INVENTION

One aspect of the present subject matter is thus to provide a transmission apparatus for transmission of electrical signals between a line driver, which is connected to a transmission line, and a switching center, in which the circuit complexity is reduced.

According to the present subject matter, this aspect is achieved by a transmission apparatus for transmission of electrical signals between a line driver, which is connected to a transmission line, and a switching center as disclosed herein.

The aspect is furthermore achieved by a transmission method for transmission of electrical signals between a line driver, which is connected to a transmission line, and a switching center.

Further refinements of the invention can be found in the dependent claims.

One basic idea of the invention is to simplify the feedback arrangement in the digital circuit part of the transmission apparatus. In particular, the invention provides a circuit arrangement in which only a single digital feedback loop is now required.

Furthermore, the circuit arrangement according to the invention makes it possible for the single digital feedback loop to operate at a signal rate which is lower than the sampling rate of an analog/digital converter.

According to the invention, feedback is provided in the digital feedback device by means of a feedback filter device which contains recursive and non-recursive filter units, such that the recursive filter units have a lower filter order than the non-recursive filter units. This advantageously considerably reduces the circuit complexity in the digital feedback device for the transmission apparatus.

A further advantage of the transmission apparatus according to the present invention is that at least one recursive filter unit is connected in parallel with a non-recursive filter unit, such that the digital feedback device comprises at least one non-recursive filter unit of a high order, and at least one recursive filter unit of a low order.

The transmission apparatus according to the invention for transmission of electrical signals between a line driver which is connected to a transmission line and a switching center essentially has:

a) an analog feedback device for coarse setting of a line voltage level on the transmission line as a function of a line current which is detected in the line driver; and b) a digital feedback device, which is coupled to the analog feedback device via an analog/digital converter and a digital/analog converter and has a feedback filter device for fine setting of an amplitude and phase relationship between the line voltage level and the line current, with the feedback filter device being designed such that a filter input signal can be converted to a filter output signal at a rate which is lower than the sampling rate of the analog/digital converter.

The method according to the invention for transmission of electrical signals between a line driver which is connected to a transmission line and a switching center essentially also has the following steps:

a) detection of a line current, which is flowing in the transmission line, by means of a current signal detection unit in the line driver;

b) coarse setting of a line voltage level on the transmission line as a function of the line current, which is detected by means of the current signal detection unit in the line driver, in an analog feedback device in the transmission apparatus; and c) fine setting of an amplitude and phase relationship between the line voltage level and the line current by means of a feedback filter device in a digital feedback device which is coupled to the analog feedback device via an analog/digital converter and a digital/analog converter, with a filter input signal being converted in the feedback filter device to a filter output signal at a rate which is lower than the sampling rate of the analog/digital converter.

Advantageous developments and improvements of the respective subject matter of the invention are included in the dependent claims.

According to one preferred development of the present invention, the feedback filter device has non-recursive and recursive filter units. The non-recursive and recursive filter units are preferably designed such that they can be connected in series and/or in parallel with one another.

According to a further preferred development of the present invention, the non-recursive filter unit in the feedback filter device has a smaller number of coefficient multiplication units than the filter order.

It is preferable for the non-recursive filter unit in the feedback filter device also to have a smaller number of delay units than the filter order. The number of delay units in the non-recursive filter unit for the feedback filter device is preferably n, with the delay units in the non-recursive filter unit in the feedback filter device each having a signal delay corresponding to a total of y clock cycles, with the relationship y=k/n being satisfied, and with y being an integer.

According to yet another preferred development of the present invention, at least one first recursive filter unit is connected in parallel with at least one non-recursive filter unit in the feedback filter device.

According to yet another preferred development of the present invention, at least one second recursive filter unit is connected in series with the parallel circuit formed by the at least one recursive filter unit and the at least one non-recursive filter unit in the feedback filter device.

According to yet another preferred development of the present invention, the at least one first recursive filter unit and the at least one second recursive filter unit have a low filter order than the at least one non-recursive filter unit in the feedback filter device.

According to yet another preferred development of the present invention, the analog feedback filter device for setting of the line voltage level on the transmission line has an amplifier unit whose gain can be selected as a function of the line current which is detected in the line driver.

According to yet another preferred development of the present invention, the at least one recursive filter unit in the feedback filter device has a filter order of unity.

Exemplary embodiments of the invention will be explained in more detail in the following description and are illustrated in the drawings, in which:

DETAILED DESCRIPTION OF THE INVENTION

The same reference symbols in the figures denote identical or functionally identical components or steps.

Figure 1:
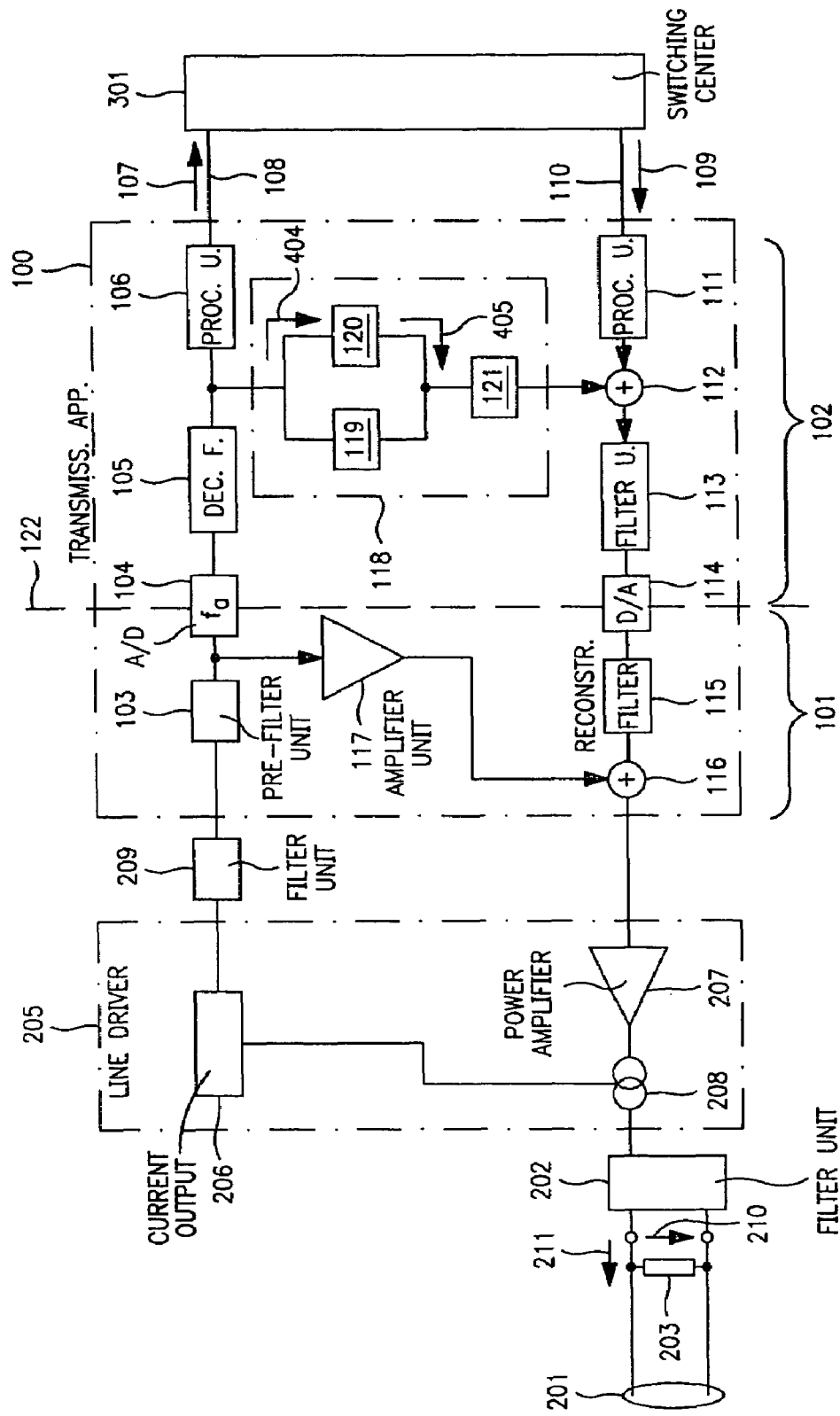
FIG. 1 shows a block diagram of the transmission apparatus according to the invention, and of its connection to a transmission line and to a switching center.

FIG. 1 shows a transmission apparatus 100, which is designed to transmit electrical signals between a line driver 205, which is connected to a transmission line 201, and a switching center 301. Circuit components which will be described briefly in the following text before describing the transmission apparatus 100 itself are connected between the transmission line 201 and the transmission apparatus 100.

The transmission line 201 has a line impedance which is represented by a component with the reference symbol 203. The line impedance is the quotient of the line voltage or the line voltage level 210 dropped along the line divided by the current 211 flowing in the line. The line voltage level 210 is the potential difference between a first connection (A conductor) of a first external filter unit 202 and a second connection (B conductor) of the first external filter unit 202. The line 201 is connected to a line driver 205 via the first external filter unit 202.

The line driver includes, inter alia, a power amplifier unit 207, a current signal detection unit 208 and a current signal output unit 206. Further functional units in the line driver 205 are not illustrated in the block diagram shown in FIG. 1, because line drivers for driving transmission lines 201 are known to the average person skilled in the art. The current 211 flowing in the line is determined by means of the current signal detection unit 208, with the current signal which is emitted from the current signal detection unit 208 being supplied to the current signal output unit 206.

The line driver 205 is in turn connected to the transmission apparatus 100 on the one hand via a line which is arranged between the output of the transmission apparatus 100 and the input of the power amplifier unit 207, and on the other hand via a second external filter unit 209. The current signal which is emitted from the current signal output unit 206 in the line driver 205 is filtered in the second external filter unit 209, and is supplied to a pre-filter unit 103 for the transmission apparatus 100. The filtered current signal which is emitted from the pre-filter unit 103 is supplied on the one hand to an analog/digital converter 104 and on the other hand to an amplifier unit 117.

It should be noted that the transmission apparatus 100 in the arrangement illustrated in FIG. 1 is subdivided into an analog part and a digital part, that is to say the transmission apparatus 100 has an analog feedback device 101 for analog signal processing, and a digital feedback device 102 for digital signal processing. An analog/digital interface 122 between the analog part and the digital part of the transmission apparatus 100 is provided on the one hand by the analog/digital converter 104 and on the other hand by a correspondingly arranged digital/analog converter 114.

Figure 3:
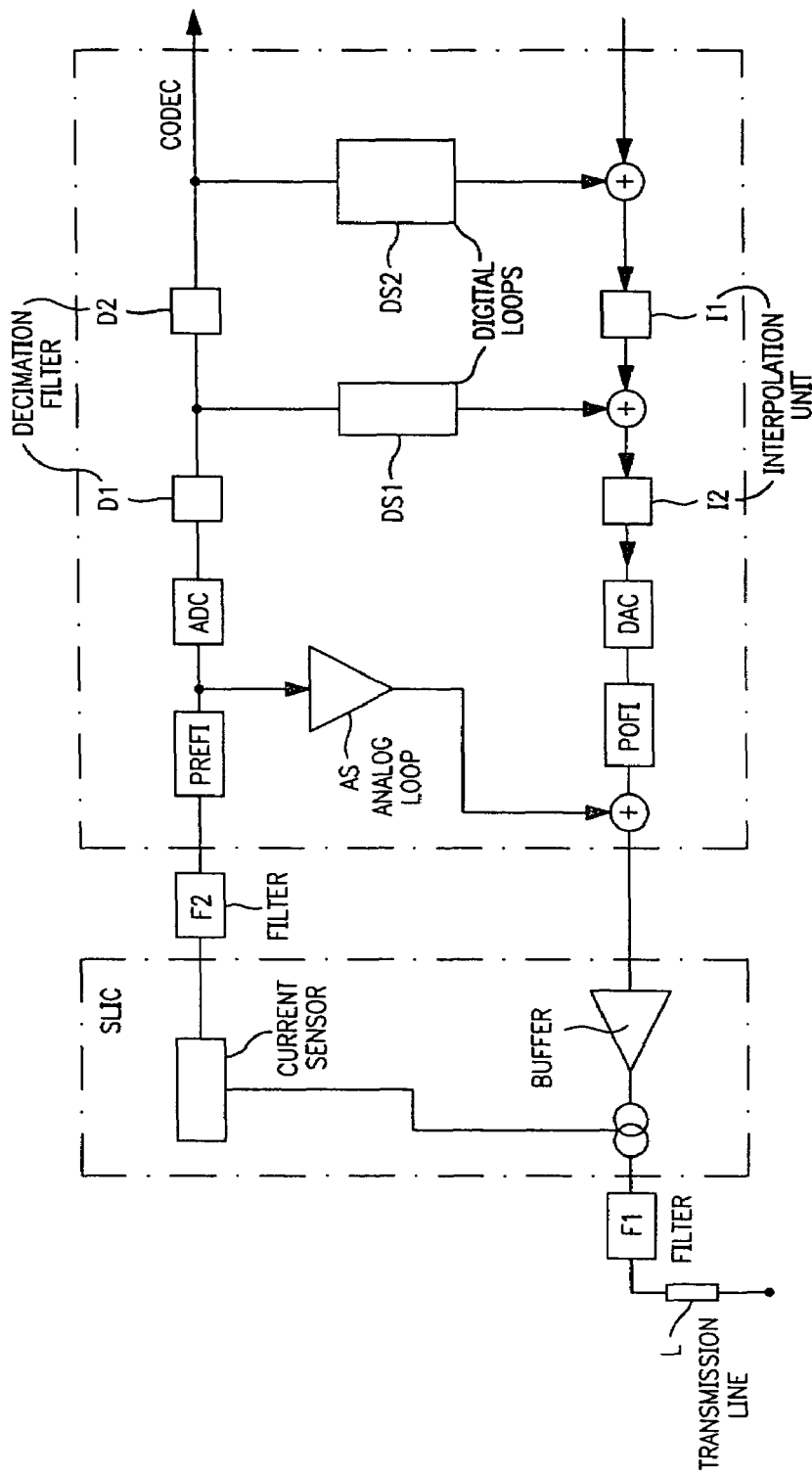
FIG. 3 shows a conventional transmission apparatus with one analog and two digital feedback loops.

In contrast to the conventional transmission apparatus shown in FIG. 3, the transmission apparatus shown in FIG. 1 and according to the present invention now has only two summation units, that is to say a first summation unit 112 and a second summation unit 116, which are respectively arranged in the digital part and in the analog part and superimpose digital and analog feedback signals, respectively, on an input signal 109 which is input to the transmission apparatus 100.

The analog feedback device 101 will be described first of all in the following text. The analog feedback device 101 is used for setting the line voltage level 210 on the transmission line as a function of the line current 211 which is detected in the line driver 205 by means of the current signal detection unit 208. For this purpose, the analog feedback device 101 has the amplifier unit 117, which, for example, provides four different gain values, with the capability to select the gain values.

The arrangement which is provided in the analog feedback device 101 may thus be regarded as a variable resistance which has four settings that can be selected. This makes it possible to match the resistance to the resistance of the transmission line 201. Matching such as this in the analog feedback device 101 relates only to the setting of the resistance in different steps, but not to modeling of a complex behavior for the line impedance 203 of the transmission line 201.

The filter, for example the second external filter unit 209, results in a phase shift in the analog feedback device, as well; however, this is generally undesirable. If, for example, the aim is to model a pure resistance, there must be no phase shift.

This means that phase shifts or phase differences between the line voltage levels 210 and the line currents 211 cannot be set and/or compensated for solely by the analog feedback device 101.

A digital circuit part in the transmission apparatus 100, that is to say the digital feedback device 102, is used to adjust the phase shift, and thus to preset any required transfer function. For this purpose, the digital feedback device 102 is supplied by means of the analog/digital converter 104 with the digitized output signal from the pre-filter unit 103, which is first of all passed to a decimation filter unit 105 in the digital feedback device 102.

It should be noted that the decimation filter unit 105 according to the preferred exemplary embodiment of the present invention is in the form of a single decimation filter unit 105 and is not, as described above with reference to the prior art, subdivided into different individual decimation filter units D1 and D2, in order to produce a further digital feedback path. The advantage of the circuit arrangement according to the invention is, in particular, that only a single digital feedback path need be provided which, furthermore, can expediently operate in a low (signal) rate range, that is to say a rate range which has been reduced by the decimation filter unit 105.

The output signal from the decimation filter unit 105, that is to say the filtered and decimated digital signal which has been sampled at a sampling rate $f_a$ by the analog/digital converter 104, is also supplied both to a feedback filter device 118, which is arranged in the digital feedback path, and on the other hand to a first processing unit 106. The first processing unit 106 is used to carry out signal processing, in order to provide the switching center 301 with an appropriately processed output signal 107 via an output line 108. The processes to be carried out in the transmission apparatus 100 for signal processing, and which are carried out essentially in processing units which are represented by blocks 106 and 111, are known to those skilled in the art in the field of information transmission.

The signal which is emitted from the switching center 301 is passed as the input signal 109 via an input line 110 to the transmission apparatus 100, where it is first of all passed to a second processing unit 111, with signal processing being carried out corresponding to a signal transmission method that is used. The signal which is emitted from the second processing unit 111 has a signal which has been fed back via the feedback filter device 118 superimposed on it in the first summation unit 112, with the sum signal being supplied to an interpolation filter unit 113.

It should be noted that the circuit arrangement according to the invention shown in FIG. 1 has only a single interpolation filter unit 113 and, in contrast to the conventional circuit arrangement shown in FIG. 3, offers the advantage that only one digital feedback loop is required.

An output signal from the interpolation filter unit 113 is supplied to a digital/analog converter 114 for conversion to an analog signal. The signal which is emitted from the digital/analog converter 114 is, finally, supplied to a reconstruction filter 115, which produces an output signal for the second summation unit 116. As has already been explained above, the analog feedback signal (which is amplified in a selectable form in the amplifying unit 117) has the signal which has been emitted from the reconstruction filter 115 superimposed on it in the second summation unit 116.

The signal which is emitted from the second summation unit 116 is, finally, emitted via a connecting line to the line driver 205, where it is supplied as an input signal to the power amplifier unit 207.

It should be noted that the first and second processing units 106, 111 for the transmission apparatus 100 are used, inter alia, for coding and/or decoding, in which case steps such as this may be used for a signal transmission process, for example using a pulse code modulation method (PCM method).

The feedback filter device 118 for the digital feedback device 102 in the transmission apparatus 100 will be described in more detail in the following text. As illustrated, the feedback filter device 118 comprises individual filter units, represented here by a first recursive filter unit 119, a non-recursive filter unit 120 connected in parallel with the first recursive filter unit 119, and a second recursive filter unit 121 which is connected in series with the parallel circuit formed by the first recursive filter unit 119 and the non-recursive filter unit 120. The arrangement of the filter units 119, 120 and 121 makes it possible to produce a programmable impedance matching loop for transmission apparatuses with only two feedback loops, that is to say a feedback loop in the analog feedback device 101 and a single feedback loop in the digital feedback device 102.

The analog/digital interface 122 between the analog feedback device 101 and the digital feedback device 102 for the transmission apparatus is provided by the analog/digital converter 104 on the one hand, and by the digital/analog converter 114 on the other hand.

Filter units for the feedback filter device 118 will be described in detail in the following text. Any desired transfer functions and phase shifts can be represented in the non-recursive filter unit 120 for the feedback filter device 118, that is to say any desired complex impedances and relationships between line voltage levels and line currents can be represented. The first recursive filter unit 119, which is connected in parallel with the non-recursive filter unit 120, in this case results in the impulse response being reduced.

The first recursive filter unit 119 is advantageously of a low order, in order to reduce the circuit complexity, and hence costs. Furthermore, the second recursive filter unit 121, which is connected in series with the parallel circuit formed by the first recursive filter unit 119 and the non-recursive filter unit 120, is likewise of a low order, and is used to further reduce the impulse response.

One major advantage of the feedback filter device 118 according to the invention is that low-order recursive filter units 119, 121 can be combined with at least one high-order non-recursive filter unit 120.

This improves the flexibility of a circuit design such as this for the transmission apparatus 100, in such a way that different impedances can be modeled with high accuracy. The lack of a second digital feedback loop reduces the circuit complexity. A high filter order now need be provided only for the non-recursive filter unit 120, which is designed such that a filter input signal 404 can be converted to a filter output signal 405 at a rate which is lower than the sampling rate $f_a$ of the analog/digital converter 104.

Figure 2:
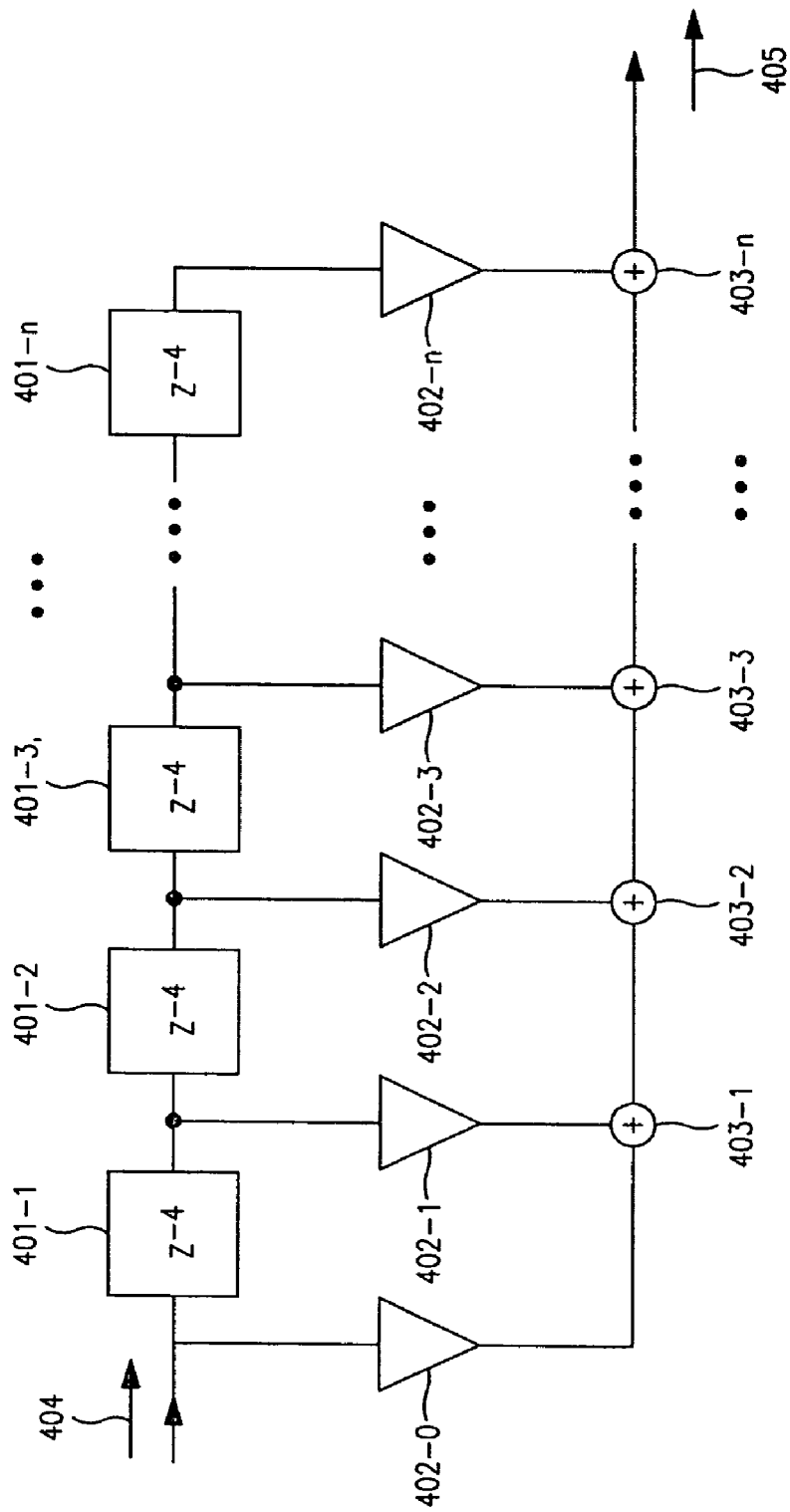
FIG. 2 shows a non-recursive filter, which is provided in a feedback filter device in the transmission apparatus, in greater detail.

FIG. 2 shows one preferred exemplary embodiment of the non-recursive filter unit 120 for the feedback filter device 118. As is illustrated in FIG. 2, the non-recursive filter unit 120 comprises delay units 410-1, ..., 401-n, which are connected in series and are represented by a z-transformation element, corresponding to a filter description by means of a z transformation. The filter input signal 404 is supplied to a first delay unit 401a and is successively delayed. The individual delayed components of the filter input signal 404 are supplied to respective coefficient multiplication units 402-0, ..., 402-n, while output signals are respectively added up in summation units 403-1, ..., 403-n to form the filter output signal 405. The circuitry of the non-recursive filter unit illustrated in FIG. 2 is simplified further by providing a reduced number of taps for corresponding coefficient multiplication units 402-0, ..., 402-n. The non-recursive filter unit 120 for the feedback filter device 118 thus has a total of m=n+1 coefficient multiplication units 402-0, ..., 402-n which is less than the filter order k. The non-recursive filter unit 120 likewise has a total n of delay units 401-1, ..., 401-n which is less than the filter order k. This circuitry simplification is achieved by the delay units for the non-recursive filter unit 120 each having a signal delay of $z^{-y}$, with the relationship y=k/n being satisfied for the signal delay exponents, and y being predetermined as an integer.

It should be noted that the non-recursive filter element 120 shown in FIG. 2 can also be implemented in transposed form.

In the example illustrated in FIG. 2, the signal delay exponent y has a magnitude of y=4, such that the total number of delay units 401-1a, ..., 401-n which are required for a corresponding filter order k is reduced by a factor of 4. Furthermore, this results in a corresponding reduction in the number of summation units 403-1, ..., 403-n, and in the number of coefficient multiplication units 402-0, ..., 402-n.

This makes it possible to simplify the circuit design, while ensuring flexibility when designing impedances with high accuracy.

It should be noted that the filter units 119, 120 and 121 which are provided in the feedback filter device 118 may be connected in parallel and/or in series as required in order to set impedances and thus to provide a programmable impedance matching loop for transmission apparatuses.

In particular, it is advantageous for the recursive filter units 119 and 121, whose circuitry is more complex, to be of a lower order than the non-recursive filter 120, whose circuitry is less complex. In one preferred exemplary embodiment of the present invention, the first recursive filter unit 119, which is connected in parallel with the non-recursive filter unit 120, has a order of unity. In this case, the circuitry of the non-recursive filter unit 120 can be optimized in a simple manner, providing a high degree of flexibility.

One advantage of the circuit arrangement according to the invention is thus that non-recursive filter units of a high order can be modeled with a small number of coefficients.

The transmission apparatus 100 according to the invention now allows country-specific input impedances to be synthesized for any desired protection circuits and for any desired line drivers. The impedances to be produced are preferably, but not exclusively, in the range from 600 Ω to 900 Ω. A high sampling rate is advantageously avoided in the feedback filter device 118.

It should be noted that the delay y of the signal delay element $z^{-y}$ may assume any desired integer values 2, 3, 4 ..., although y=4 is illustrated here, by way of example.

Reference should be made to the introduction to the description for the conventional transmission apparatus, which is illustrated in FIG. 3, for transmission of electrical signals between a line driver, which is connected to a transmission line, and a switching center.

Although the present invention has been described above with reference to preferred exemplary embodiments, it is not restricted to these but may be modified in various ways.

The invention is also not restricted to the application options mentioned.

LIST OF REFERENCE SYMBOLS

The same reference symbols in the figures denote identical or functionally identical components or steps.
100 Transmission apparatus
101 Analog feedback device
102 Digital feedback device
103 Pre-filter unit
104 Analog/digital converter
105 Decimation filter unit
106 First processing unit
107 Output signal
108 Output line
109 Input signal
110 Input line
111 Second processing unit
112 First summation unit
113 Interpolation filter unit
114 Digital/analog converter
115 Reconstruction filter
116 Second summation unit
117 Amplifier unit
118 Feedback filter device
119 First recursive filter unit
120 Non-recursive filter unit
121 Second recursive filter unit
122 Analog/digital interface
201 Transmission line
202 First external filter unit
203 Line impedance
205 Line driver
206 Current signal output unit
207 Power amplifier unit
208 Current signal detection unit 209 Second external filter unit
210 Line voltage level
211 Line current
301 Switching center
410-1, Delay unit
401-$n$
402-0, Coefficient multiplication unit
402-$n$
403-1, Summation unit
403-$n$
404 Filter input signal
405 Filter output signal
k Filter order
m Number of coefficient forming units
n Number of delay units
y Signal delay exponent
z z-transformation element

What is claimed is:

1. Transmission apparatus for transmission of electrical signals between a line driver, which is connected to a transmission line, and a switching center, having:
   a) an analog feedback device for coarse setting of a line voltage level on the transmission line as a function of a line current which is detected in the line driver; and
   b) a digital feedback device, which is coupled to the analog feedback device via an analog/digital converter and a digital/analog converter and has a single digital feedback path having a feedback filter device for fine setting of an amplitude and phase relationship between the line voltage level and the line current, wherein
   c) the feedback filter device is designed such that a filter input signal can be converted to a filter output signal at a rate which is lower than the sampling rate of the analog/digital converter, wherein
   d) the feedback filter device comprises a first recursive filter unit, a non-recursive filter unit connected in parallel with the first recursive filter unit, and a second recursive filter unit which is connected in series with the parallel circuit formed by the first recursive filter unit and the non-recursive filter unit; and wherein
   e) the digital feedback device comprises a processing unit for carrying out signal processing in order to provide the switching center with a processed output signal, wherein the filter input signal is also supplied to the processing unit.

2. Apparatus according to claim 1, wherein the non-recursive filter unit in the feedback filter device has a smaller number of coefficient multiplication units than the filter order.

3. Apparatus according to claim 1, wherein the non-recursive filter unit in the feedback filter device has a smaller number of delay units than the filter order.

4. Apparatus according to claim 3, wherein the delay units in the non-recursive filter unit in the feedback filter device each have a signal delay of y clock cycles, while the relationship $y=k/n$ is satisfied, and y is an integer, wherein k is the filter order and n is the number of delay units in the non-recursive filter unit.

5. Apparatus according to claim 1, wherein the first recursive filter unit and the second recursive filter unit are of a lower filter order than the non-recursive filter unit in the feedback filter device.

6. Apparatus according to claim 1, wherein the analog feedback device for coarse setting of the line voltage level on the transmission line has an amplifier unit whose gain can be selected as a function of the line current which is detected in the line driver.

7. Apparatus according to claim 1, wherein the at least one recursive filter unit in the feedback filter device has a filter order of unity.

8. Transmission method for transmission of electrical signals between a line driver, which is connected to a transmission line, and a switching center, having the following steps:
   a) detecting of a line current, which is flowing in the transmission line, by means of a current signal detection unit in the line driver;
   b) coarse selling of a line voltage level on the transmission line as a function of the line current, which is detected by means of the current signal detection unit in the line driver, in an analog feedback device in the transmission apparatus; and
   c) fine setting of an amplitude and phase relationship between the line voltage level and the line current by means of a feedback filter device in a digital feedback device which has a single digital feedback path and which is coupled to the analog feedback device via an analog/digital converter and a digital/analog converter, wherein
   d) converting a filter input signal in the feedback filter device to a filter output signal at a rate which is lower than the sampling rate of the analog/digital converter, wherein the feedback filter device comprises a first recursive filter unit, a non-recursive filter unit connected in parallel with the first recursive filter unit, and a second recursive filter unit which is connected in series with the parallel circuit formed by the first recursive filter unit and the non-recursive filter unit; and wherein
   e) the digital feedback device comprises a processing unit for carrying out signal processing in order to provide the switching center with a processed output signal, wherein the filter input signal is also supplied to the processing unit.

9. Method according to claim 8, wherein the line voltage level on the transmission line is set in the analog feedback device by means of an amplifier unit whose gain can be selected as a function of the line current which is detected in the line driver.

* * * * *